United States Patent [19]

Berkey

[11] Patent Number: 4,561,871

[45] Date of Patent: Dec. 31, 1985

[54] METHOD OF MAKING POLARIZATION PRESERVING OPTICAL FIBER

[75] Inventor: George E. Berkey, Pine City, N.Y.

[73] Assignee: Corning Glass Works, Corning, N.Y.

[21] Appl. No.: 565,637

[22] Filed: Dec. 27, 1983

[51] Int. Cl.[4] ........................................... C03B 37/023
[52] U.S. Cl. ...................................... 65/3.11; 65/3.12; 65/13; 65/61
[58] Field of Search ............... 65/3.11, 3.12, 13, 18.4, 65/61; 350/96.33

[56] References Cited

U.S. PATENT DOCUMENTS

| | | | |
|---|---|---|---|
| 3,455,666 | 7/1969 | Bazinet, Jr. | 65/61 |
| 4,217,488 | 8/1980 | Hubbard | 350/96.33 |
| 4,229,197 | 10/1980 | Streng | 65/3.11 |
| 4,251,251 | 2/1981 | Blankenship | 65/18.2 |
| 4,395,270 | 7/1983 | Blankenship et al. | 65/3.11 |

FOREIGN PATENT DOCUMENTS

| | | | |
|---|---|---|---|
| 36941 | 3/1983 | Japan | 65/3.11 |
| 145631 | 8/1983 | Japan | 65/3.11 |
| 2096788 | 10/1982 | United Kingdom . | |

OTHER PUBLICATIONS

IOOC, Jun. 27–30, 1983, Tokyo, Japan, Paper No. 29A-5–1, Y. Sasaki, et al.

Primary Examiner—S. Leon Bashore
Assistant Examiner—Michael K. Boyer
Attorney, Agent, or Firm—W. J. Simmons, Jr.

[57] ABSTRACT

A single-mode optical waveguide is constructed in a manner such that the core thereof is subjected to a stress-induced birefringence. A single-mode optical fiber preform is formed by a CVD process. A pair of longitudinally extending holes is formed on opposite sides of the core, spaced slighty therefrom. A stress rod having a TCE different from that of the cladding portion of the preform is inserted into each hole. The space between the holes and the rods is evacuated. The resultant composite structure is drawn into an optical fiber. A similar method is used to form a fiber having multiple light conducting cores, this method differing in that the rods which are inserted into the holes are formed of a glass having a refractive index greater than that of the cladding portion of the preform.

7 Claims, 12 Drawing Figures

U.S. Patent   Dec. 31, 1985   Sheet 1 of 2   4,561,871
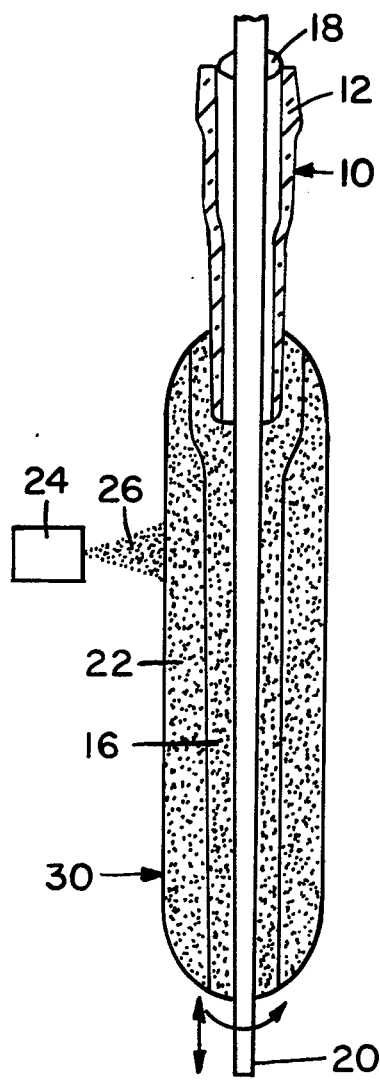
Fig. 1
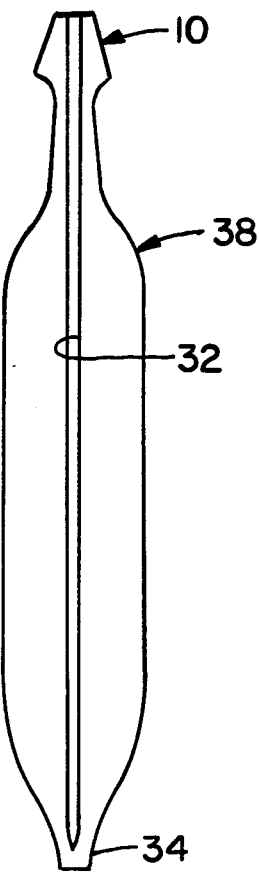
Fig. 2
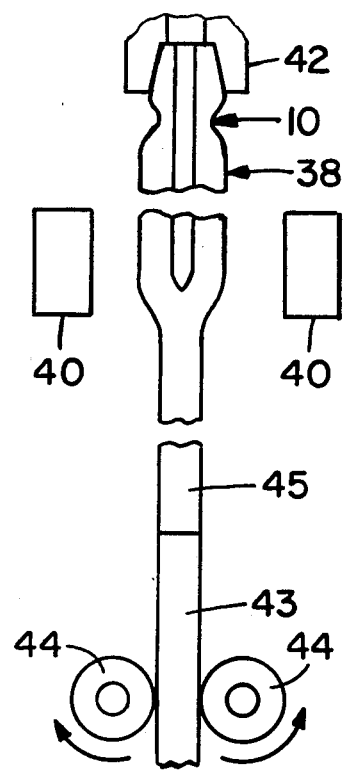
Fig. 3
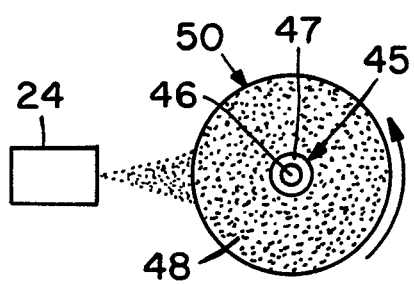
Fig. 4
Fig. 5
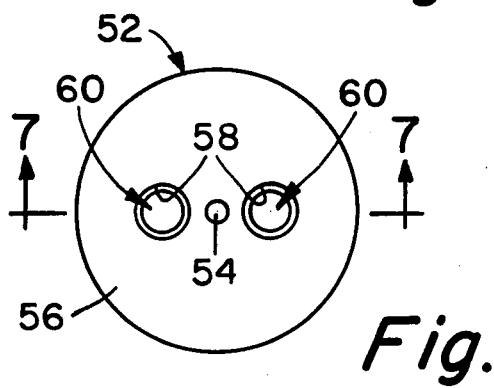
Fig. 6

METHOD OF MAKING POLARIZATION PRESERVING OPTICAL FIBER

BACKGROUND OF THE INVENTION

This invention relates to a method of making glass optical fibers having a cladding containing more than one longitudinally-extending region the composition of which is different from that of the cladding. Various types of optical fibers including polarization preserving single-mode fibers and fibers having multiple light conducting cores contain such longitudinally-extending regions.

U.S. Pat. No. 4,395,270 discloses a single-mode fiber that is fabricated in such a manner as to deliberately enhance stress-induced birefringence, thereby preventing or reducing rotation of the polarization plane of the signal propagating therethrough. That patent teaches that strain-induced birefringence can be introduced by adding to diametrically opposite sides of the core a pair of longitudinally-extending regions of glass having a thermal coefficient of expansion (TCE) different from that of the cladding glass.

Three manufacturing techniques are disclosed in U.S. Pat. No. 4,395,270. (1) A first glass rod having a central core surrounded by cladding glass is placed centrally in a glass tube. Rods of glass having a TCE different from that of the cladding glass are put in the tube on opposite sides of the first rod. Rods of cladding glass are placed in the interstices. (2) A soot preform is deposited on a rotating mandrel. In one embodiment, mandrel rotation is halted to deposit one longitudinally extending region and then rotated 180° to deposit the other such region. In a modified embodiment the mandrel continuously rotates and the deposition burner is continuously supplied with reactant gas for forming a base cladding glass and is also provided with pulses of a reactant gas for modifying the base glass to form the diametrically opposed regions. (3) A chemical vapor deposition (CVD) process is modified by inserting a pair of tubes into the substrate tube when the longitudinally extending regions are to be deposited. There is passed through the substrate tube a gas which reacts to form particles of a base cladding glass and there is passed through the pair of tubes another gas which reacts to form dopant glass particles which combine with base glass particles to form longitudinal strips of doped base glass within the tube.

It is difficult to form fibers having stress rods of certain cross-sectional shapes such as circular by these techniques. As discussed in U.K. Patent Application GB No. 2,096,788 A, an optical fiber preform can be assembled by inserting circular rods of high expansion glass into a silica tube along with silica rods and a centrally-located core preform. However, the high expansion, stress-applying rods deform and fill the interstices between adjacent silica rods, since the viscosity of the stress-applying glass rods is lower than that of the silica glass. Another problem inherent in the rod-in-tube technique arises from the plethora of interstices between the multiplicity of rods that must be assembled to form the preform from which the fiber is drawn. A fiber drawn from such a rod-in-tube preform is more likely to contain imperfections such as seeds, bubbles and diameter upsets than a preform having little or no interstices.

Optical waveguide fibers having a plurality of light transmitting cores are disclosed in U.S. Pat. Nos. 3,941,474 and 4,300,816. In accordance with the teachings of U.S. Pat. No. 3,941,474 such a fiber is formed by a double crucible apparatus, the inner crucible having a plurality of nozzle tips which form the cores. Fibers formed by such apparatus are limited in composition to those which can be melted in crucibles. Also, impurities can be introduced into the fiber from the crucible. U.S. Pat. No. 4,300,816 suggests the rod and tube technique as being satisfactory for forming multiple core fibers. As mentioned previously, it is difficult to form circular cores by that technique.

SUMMARY OF THE INVENTION

It is therefore an object of the present invention to provide a method of forming an optical fiber having precisely shaped longitudinally-extending regions such as stress rods or light-conducting cores.

Another object of the present invention is to provide an improved method of forming an optical fiber having precisely positioned stress-applying rods of predetermined shape on diametrically opposed sides of an axial core.

Briefly, the present invention relates to a method of forming an optical fiber comprising a cylindrically shaped mass of cladding glass through which there extends a plurality of longitudinally-extending regions of glass having a composition different from that of the cladding. The method comprises providing a cylindrical preform of glass having a first composition. A plurality of longitudinally-extending holes is formed in the preform. There is provided a plurality of rods of glass having a composition different from that of the first composition. One of the rods is inserted into each of the holes. The resulting assembly is heated and drawn to bond together the glass rods and the preform into an integral structure and to reduce the diameter thereof to form an optical fiber.

To form a single-mode fiber having polarization retaining characteristics the cylindrical glass preform comprises a centrally disposed glass core surrounded by a layer of cladding glass having a refractive index lower than that of the core glass. A pair of longitudinally-extending holes is formed on diametrically opposed sides of the core. The rods, which are inserted into the holes, are formed of glass having a TCE different from that of the cladding glass. In a specific embodiment, four equally spaced holes are formed around the core. Rods of glass having a TCE higher than that of the cladding glass are inserted into one diametrically opposed pair of holes. The remaining pair of holes can remain empty or can be provided with a pair of rods of glass having a TCE lower than that of the cladding glass.

To form a fiber having multiple light conducting cores the cylindrical preform comprises cladding glass and optionally includes a centrally disposed core of glass having a refractive index higher than that of the cladding glass. A plurality of longitudinally-extending holes is formed in the cladding glass preform. Rods of glass having a refractive index greater than the of the cladding glass are inserted into the holes.

A vacuum connection may be attached to that end of the perform remote from the end from which the fiber is drawn to evacuate the gap between the rods and the longitudinally-extending holes. In a preferred embodiment, a glass tube is fused to the preform prior to inserting the rods. The vacuum connection is then affixed to the glass tube.

Both the stress rods and the rods of core glass are preferably clad with a glass having viscosity characteristics similar to those of the preform cladding glass, and such rod cladding glass may have the same composition as the preform cladding.

BRIEF DESCRIPTION OF THE DRAWING

FIG. 1 illustrates the application of successive coatings of glass soot to a mandrel.

FIG. 2 is a cross-sectional view of a consolidated glass preform.

FIG. 3 is a schematic diagram illustrating the drawing of a rod or intermediate fiber from the preform.

FIG. 4 illustrates the application of an outer cladding to the intermediate fiber.

FIG. 5 is a cross-sectional view of the preform of FIG. 4 after consolidation thereof.

FIG. 6 is a cross-sectional view of the preform of FIG. 5 after it has been provided with stress-inducing rods.

DESCRIPTION OF THE PREFERRED EMBODIMENT

Figure 7:
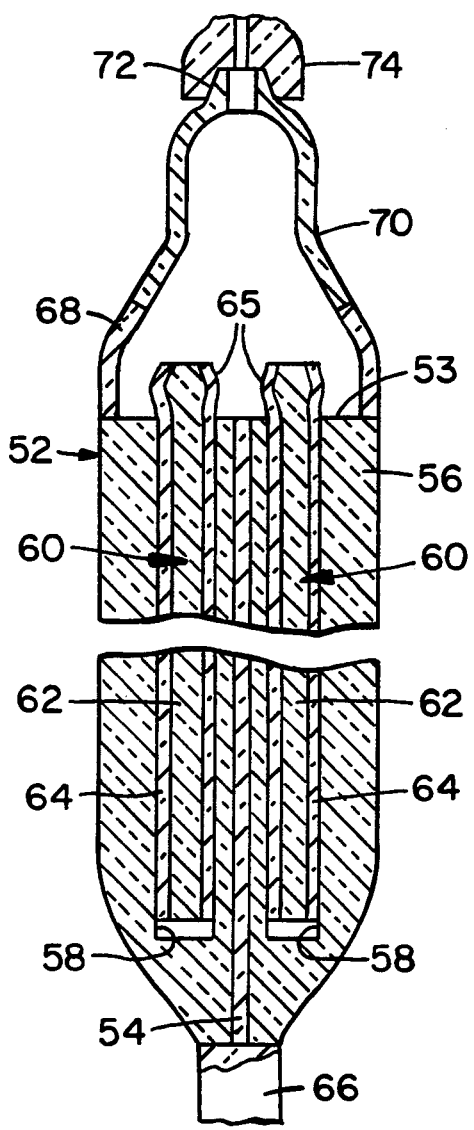
FIG. 7 is a cross-sectional view taken along lines 7—7 of FIG. 6.

It is to be noted that the drawings are illustrative and symbolic of the invention, and there is no intention to indicate scale or relative proportions of the elements shown therein.

According to a first embodiment of this invention there is initially formed a single-mode optical fiber preform of the type shown in FIG. 5. Whereas any vapor deposition technique suitable for forming the preform of FIG. 5 may be employed, preferred methods are disclosed in my copending U.S. patent applications Ser. No. 402,056 "Method of Making Glass Optical Fiber" filed July 26, 1982 now U.S. Pat. No. 4,453,961 and Ser. No. 427,525 "Devitrification Resistant Flame Hydrolysis Process" filed Sept. 29, 1982 now U.S. Pat. No. 4,486,212. A preferred method of forming the preform of FIG. 5 is briefly described below.

A porous preform is formed in accordance with the method illustrated in FIG. 1. A handle 10 of the type disclosed in U.S. Pat. No. 4,289,522 may be employed. Handle 10 is a tubular member having a ground glass joint 12 at one end thereof. The large diameter end of a tapered mandrel 20 extends through handle 10 and is secured thereto by shims 18. The ends of the mandrel are mounted in a lathe where it is rotated and translated as indicated by the arrows. The mandrel may be initially coated with carbon soot to facilitate removal of the soot preform.

Fuel gas and oxygen or air are supplied to burner 24 from a source (not shown). This mixture is burned to produce a flame which is emitted from the burner. A gas-vapor mixture is oxidized within the flame to form a glass soot stream 26 which is directed toward mandrel 20. Suitable means for delivering the gas-vapor mixture to the burner are well known in the art; for an illustration of such means reference is made to U.S. Pat. Nos. 3,826,560, 4,148,621 and 4,173,305. One or more auxiliary burners (not shown) may be employed to direct a flame toward one or both ends of the soot preform during deposition to prevent breakage. This method can be employed to produce any type of core index profile including step index and gradient index. For an illustration of suitable burners, reference is made to U.S. Pat. Nos. 3,565,345 and 4,165,223 and to my aforementioned U.S. Pat. No. 4,486,212. Said application shows a burner wherein a centrally located orifice in the burner face is surrounded by three rings of orifices. The reactant compounds emanate from the central orifice where they are subjected to heat from a flame produced by the fuel gas and oxygen emanating from the middle ring of orifices. A stream of oxygen, referred to as the inner shield, emanates from the inner ring of orifices; this stream prevents reaction of the reactant compounds at the burner face. Finally, a stream of oxygen referred to as the outer shield emanates from the outer ring of orifices. This burner design is somewhat similar to that disclosed in U.S. Pat. No. 3,698,936 issued to H. J. Moltzan, the Moltzan patent differing in that it teaches an annular slot for providing the inner shield and in that it lacks the outer shield orifices. The burner orifices are supplied by manifolds in a manner similar to that taught in the Moltzan patent.

Soot deposition means 24 may also comprise nozzles such as those disclosed in U.S. Pat. No. 3,957,474 which emit reactant vapors which are heated by means such as a laser beam to form a soot stream.

A first coating 16 of core soot is applied to mandrel 20 while it is rotated and translated for uniform deposition of the soot. Generally, each coating of glass soot is formed of a plurality of layers of soot, each layer being formed by a single pass of the burner along the length of rod 20. A second coating 22 of glass soot is applied over the outside peripheral surface of first coating 16.

In accordance with well known practice the refractive index of coating 22 is made lower than that of coating 16 by changing the composition of the soot being produced in flame 26. This can be accomplished by changing the concentration or type of dopant material being introduced into the flame, or by omitting the dopant material. Mandrel 20 is again rotated and translated to provide a uniform deposition of coating 22. The composite structure including first coating 16 and second coating 22 constitutes a preliminary soot preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core can consist of fused silica doped with a material to increase its refractive index.

There are many suitable materials that can satisfactorily be used as a core dopant alone or in combination with each other. These include, but are not limited to, titanium oxide, tin oxide, niobium oxide, zirconium oxide, aluminum oxide, lanthanum oxide, phosphorus oxide and germanium oxide.

After deposition of particulate soot material to the extent required to form preliminary soot preform 30, mandrel 20 may be removed from the assembly by pulling it out through handle 10, thereby leaving a longitudinal aperture. Integral handle 10 provides a support for subsequent handling and processing.

The ground glass joint portion of handle 10 is secured into a complementary female ground glass joint member, whereby drying gas may be flowed through handle 10, into the preform aperture and outwardly through the preform interstices. The steps of drying and consolidating may be performed in accordance with the teachings of U.S. Pat. No. 4,125,388, which patent is hereby expressly incorporated by reference. As taught by said patent, drying may be accomplished before or during the consolidation step.

Drying can be facilitated by inserting a short section of capillary tubing into that end of the porous preform aperture opposite handle 10 as disclosed in my aforementioned U.S. Pat. No. 4,486,212. After consolidation, aperture 32 of preliminary consolidated preform 38 usually remains open as shown in FIG. 2.

A devitrified layer may form on the aperture-forming surface of the preform. In accordance with my aforementioned U.S. Pat. No. 4,453,961, the aperture may be acid etched to remove the devitrified layer. In accordance with the teachings of my aforementioned U.S. Pat. No. 4,486,212, an improved soot laydown technique prevents devitrification of the aperture-forming surface of the preform, and etching of that surface therefore becomes unnecessary. Both of said copending applications teach that end 34 of the preform aperture is initially closed. If a capillary tube is inserted into that end of the soot preform, end 34 will close during consolidation. If no such plug is employed, the entire aperture will remain open. In this event end 34 is heated and pinched shut after consolidation.

Preliminary consolidated preform 38 is stretched into an intermediate, large diameter fiber which is thereafter provided with additional cladding glass. The surface of preform 38 is prepared in a conventional manner prior to deposition of the outer cladding. If it has been handled or permitted to become dirty, several cleaning steps are typically required. It is washed in deionized water and then washed in an isopropyl alcohol bath. It is then etched in HF to remove a few microns of glass or about 1% of the article weight. Then preform 38 is rinsed in deionized water and degreased with isopropyl alcohol.

The intermediate fiber can be formed in a conventional draw furnace wherein the tip of the consolidated preform from which the intermediate fiber is being drawn is heated to a temperature which is slightly lower than the temperature to which the preform would be subjected to draw optical fiber therefrom. A temperature of about 1900° C. is suitable for a high silica content preform. A suitable method for forming an intermediate fiber is illustrated in FIG. 3. Preform 38 is mounted in a conventional draw furnace where the tip thereof is heated by resistance heater 40. A vacuum connection 42 is attached to handle 10, and the preform aperture is evacuated. A glass rod 43, which is attached to the bottom of preform 38, is pulled by motor-driven tractors 44, thereby causing the intermediate fiber 45 to be drawn at a suitable rate. A rate of 15 to 23 cm/min has been found to be adequate. As the intermediate fiber or rod is drawn, the aperture readily closes since the pressure therein is low relative to ambient pressure. The average diameter of an intermediate fiber that is to be employed as a mandrel upon which cladding soot is to be deposited is preferably in the range of 4 to 10 mm.

As shown in FIG. 4, intermediate fiber 45, which comprises core region 46 and cladding region 47, is employed as a mandrel upon which soot coating 48 is deposited by burner 24. Coating 48 is generally formed of the same material as the cladding portion 47 of intermediate fiber 45.

The resultant composite preform 50 is then consolidated to form a solid glass draw blank 52 of FIG. 5. During the consolidation process, composite preform 50 is gradually inserted into a furnace through which a consolidation atmosphere flows. The atmosphere preferably contains helium and an amount of chlorine sufficient to dry the soot prior to the time that consolidation occurs. About 5 vol. % chlorine is usually sufficient.

Whereas a preferred method of forming the consolidated preform of FIG. 5 has been described above, it can be formed by other methods such as the axial vapor deposition process disclosed in U.S. Pat. Nos. 3,957,474 and 4,231,774. Indeed, any CVD technique is suitable for the present method provided that it is capable of forming a high purity preliminary consolidated preform having a glass core surrounded by a layer of cladding glass. For example, layers of cladding glass and core glass can be formed on the inner surface of a substrate tube in accordance with the teachings of U.S. Pat. No. 4,298,364. The coated tube is collapsed to form a solid glass article similar to that shown in FIG. 5.

Consolidated preform 52 comprises core 54 and cladding 56. One end is preferably severed from preform 52 to form a flat endface 53 as shown in FIG. 7. Two holes 58 are formed in the cladding on opposite sides of core 54 by any suitable technique such as core drilling, ultrasonic drilling, or the like. Holes 58 may terminate just short of one end of preform 52 as shown in FIG. 7, or they may extend entirely therethrough. Holes 58 are preferably treated to remove imperfections from the walls thereof. For example, the wall-forming surfaces can be smoothed by a diamond hone or grinding powder and/or etched with hydrofluoric acid. However, in a preferred technique, the walls of holes 58 are smoothed by suspending the preform in a furnace and raising its temperature to a level just below that which would cause the preform to elongate. For high $SiO_2$ content blanks this temperature is in the range of 1850°–1900° C.

Into holes 58 are inserted rods 60 of glass having a TCE that is different from that of the cladding glass by an amount sufficient to provide the desired birefringence. Although rods 60 may have a uniform composition throughout, it may be advantageous to employ composite rods which comprise a core region of glass selected for its TCE and a cladding region that is compatable with preform cladding 56. It is thought that by employing a stress rod that is clad with a glass of the same composition as the preform cladding, the interface between the rod and cladding will be resistant to seed formation during fiber drawing. If the stress rod contains a cladding layer 64, it may be advatageous to grade the composition of the core portion 62 of the rod so that the coefficient of expansion of the glass at the center of the rod is gradually matched to that of the cladding portion of the rod to prevent breakage during fabrication of the rod. Since some high expansion glass compositions suitable for use as stress rods are much softer than the silica cladding glass, it may be advantageous to clad the soft glass rod with a hard glass to preserve the shape of the rod during the drawing process. Without such hard glass cladding, the soft, high expansion glass rod can melt during the fiber drawing process and build up a pressure within the molten portion of the preform which can distort the true size and shape of the stress rods in the resultant fiber.

The following technique may also be employed to prevent the rods from melting and sliding downwardly into the holes. Upper ends 65 of the rods can be enlarged so that upon insertion of the rods into holes 58, the enlarged ends bind at endface 53 and protrude from the preform. The enlarged end can be formed by heating the end with a flame and pressing the end against a surface to cause it to bulge. It could also be formed by attaching a bead of molten glass to the circumferential surface of the end of a rod. The enlarged ends of the rods do not prevent evacuation of the space between the rods and the adjacent walls of the holes.

The stress rods can be formed of any of the stress rod glass compositions set forth in U.S. Pat. No. 4,395,270 and in G.B. No. 2,096,788 A. For example, it may consist of silica doped with one or more of the oxides $GeO_2$, $B_2O_3$, $P_2O_5$, $TiO_2$, F, $Al_2O_3$, $ZrO_2$, and $Sb_2O_5$. If cladding 56 consists of pure silica, the stress rod can be formed of silica doped with a plurality of oxides to provide a refractive index equal to that of silica. For example, $SiO_2$ could be doped with one of the following combinations of dopant oxides: $GeO_2$ and $B_2O_3$ or $P_2O_5$ and $B_2O_3$ or $GeO_2$, $P_2O_5$ and $B_2O_3$.

The assembly illustrated in FIGS. 6 and 7 is inserted into a conventional draw furnace and drawn into a fiber. A glass rod 66 may be fused to the end of preform 52 to initiate the fiber drawing process. During the drawing process, rods 60 soften and bond to the walls of holes 58. Thus, there is formed an integral optical fiber containing no interstices, gaps, bubbles or the like.

A vacuum connection is preferably secured to the top of draw blank 52 during the fiber drawing operation. This minimizes the amount of gas and water vapor present in the gap between rods 60 and the walls of holes 58 and decreases the liklihood that upsets will occur during this operation. A preferred method of attaching a vacuum connection is as follows. Prior to inserting rods 60 into holes 58, a tube 68 of high temperature glass such as silica is fused to surface 53. The outer diameter of tube 68 is preferably the same as that of preform 52. If rods 60 had been inserted prior to the fusion of tube 68 to preform 52, the softer glass within rods 60 could flow and fill the gaps between the rods and the preform. Thus, when the vacuum is applied over end 53 of the preform, that vacuum would be prevented from communicating with the lower ends of holes 58.

The end of tube 68 opposite the preform may be tapered inwardly. Such a taper can be effected by flameworking the tube. The diameter of the tapered end of the tube should be large enough to permit the insertion of rods 60 therethrough. After rods 60 have been inserted into holes 58, a glass fitting 70 is fused to tube 68. The end of fitting 70 is provided with a ground glass joint 72 to which vacuum connection 74 can be attached.

In an alternative method, tube 68 initially has no inward taper. Rods 60 are inserted into holes 58 after tube 68 is fused to the preform. The preform is rotated and the end of tube 68 is flameworked to cause it to shrink inwardly.

Figure 8:
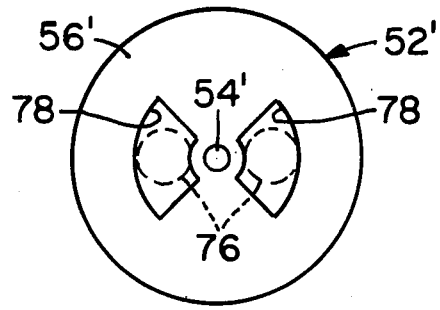
FIG. 8 is a cross-sectional view of a preform having non-circular holes.

The method of the present invention can also be employed to form single-mode optical fibers having non-circular stress rods. The preform for one such fiber is illustrated in FIG. 8 wherein elements similar to those of FIG. 7 are represented by primed reference numerals. To form stress rods having the sector-shaped cross-section disclosed in the aforementioned U.K. Patent Application G.B. No. 2,096,788 A, circular holes shown by dashed lines 76 can be formed in cladding 56' on opposite sides of core 54'.

Holes 78 of irregular or non-symmetrical shape can then be formed by ultrasonic drilling. They could also be formed by core drilling circular holes as indicated by dashed line circles 76 and thereafter selectively removing regions of the cladding glass adjacent to holes 76. This could be accomplished by a reciprocating diamond hone or by a reciprocating wire which extends entirely through hole 76. An abrasive slurry is flowed through the hole to assist the cutting action of the hone or wire.

Figure 9:
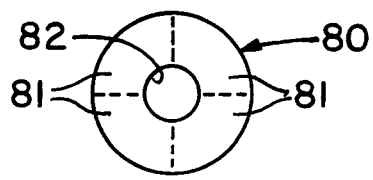
FIG. 9 is a cross-sectional view of a glass tube employed in the fabrication of segment-shaped stress rods.
Figure 10:
FIG. 10 is a cross-sectional view of a clad, segment-shaped stress rod.

One or more circular stress rods formed of soft glass could be inserted into holes 78, and the resultant preform could be evacuated and drawn into a fiber as described in conjunction with FIG. 7. The soft stress rod glass would melt and flow into the interstices of the sector shaped holes. However, the stress rods are preferably sector-shaped and clad with a glass of the same composition as that of cladding 56'. Appropriately shaped rods can be formed by initially forming a glass cylinder by any suitable method such as melting, flame hydrolysis or the like. As shown in FIG. 9, cylinder 80 is provided with an axial hole 82 and is then cut into four segment-shaped rods 81 as indicated by the dashed lines. A segment-shaped rod 81 can be inserted into each hole 78. If desired, the rod is first rotated in a lathe and provided with a thin coating of cladding soot in the manner illustrated in FIG. 4. The cladding soot is consolidated on the rod to form the clad, sector shaped rod 83 of FIG. 10. Rod 83 is substantially the same shape as hole 78 and just slightly smaller than that hole. Rod 83 can be formed having a cross-sectional area larger than that of hole 78, and it can be heated and stretched to decrease its cross-sectional area to a value sufficiently small to permit insertion into hole 78.

As taught in the aforementioned U.S. Pat. No. 4,395,270, a fiber may contain a second set of discrete, diametrically opposed longitudinally-extending regions having physical characteristics which are different from those of the first set of stress-inducing regions. The fiber illustrated in FIG. 11 comprises core 85 and cladding 86. Two longitudinally-extending regions 87, which have a TCE different from that of the cladding region, are diametrically opposed relative to core 85. Orthogonally disposed with respect to regions 87 is a second pair of longitudinally-extending regions 88 which may comprise a glass having a TCE which deviates from that of cladding 86 in a direction different from the direction in which the TCE of regions 87 deviates from that of cladding 86.

Figure 11:
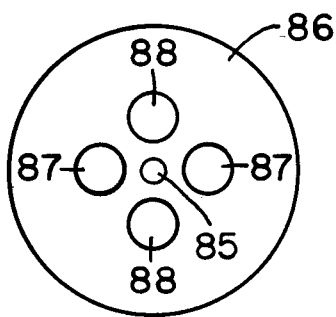
FIG. 11 is a cross-sectional view of a preform which is adapted to receive four stress rods.

The fiber of FIG. 11 can be formed by drilling four holes in a preform in the manner described in conjunction with FIGS. 6 and 7. Into two opposite holes are inserted rods of glass having a first TCE. For example, if cladding 86 consisted of $SiO_2$, rods 87 could comprise SiO$_2$ doped with B$_2$O$_3$ and P$_2$O$_5$ while rods 88 could comprise SiO$_2$ doped with TiO$_2$. In the resultant fiber, regions 87 will be in a state of tension while regions 88 will be in a state of compression. The effect of the two tensive regions is additive with that of the two compressive regions, the resultant combination providing a greater magnitude of stress-induced birefringence than that which would be obtainable with either regions 87 or 88 alone.

In a modification of the embodiment of FIG. 11 two rods of high expansion glass are inserted into opposite holes and the remaining two holes are left empty. The fiber drawn from such a preform includes two diametrically opposed cylindrically shaped holes which are orthogonally situated with respect to two tensive stress rods. As in the previous embodiment, the effect of the two empty holes is additive with the effect of the two tensive regions.

A multiple core fiber may be formed by a method similar to that described above. Whereas preform 52 of FIG. 7 comprises a cladding 56 and centrally disposed core 54, a preform used in the fabrication of a multiple core optical fiber need not have such a core, although it may optionally include a core.

Figure 12:
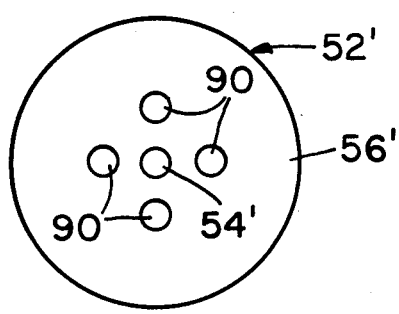
FIG. 12 is a cross-sectional view of a preform employed in the fabrication of a multiple core optical fiber.

In an embodiment in which the initially formed preform comprises a core, preform 52 would be provided with a plurality of holes around core 54, the number of such holes being sufficient to provide the additional light-conducting cores. Into such holes are inserted rods of high purity glass having a refractive index greater than that of preform cladding 56. The resultant fiber draw blank is illustrated in FIG. 12 wherein elements similar to those of FIG. 6 are represented by primed reference numerals. The initally formed preform 52' may comprise cladding 56' and a centrally disposed core 54'. Four equally spaced holes can be around core 54'. Into each of the holes is placed a rod 90 of core glass. As described above, rods 90 can be of uniform composition or of varying composition so as to exhibit a radially graded refractive index profile. Also, rods 90 may be unclad, but they are preferably clad with a glass having the same composition as preform cladding 56'.

If the initially-formed preform has a uniform composition throughout, ie. it initially has no core portion, then it can be provided with predetermined number of cores by drilling therein that predetermined number of holes and placing a rod of core glass into each hole.

A vacuum connection is attached to the blank as described above to evacuate the gaps between the rods of core glass and the adjacent walls of the preform holes to decrease hydroxyl ion contamination. The preform is then drawn into a fiber having plurality of light-conducting cores.

The following example illustrates the manner in which the method of the present invention can be employed to produce a polarization retaining single-mode optical fiber. The method described in conjunction with FIGS. 1 through 5 was employed to produce an optical fiber preform. More specifically, a layer of carbon soot was first deposited along a 49 cm section of an alumina mandrel which tapered from about 5.5 mm to 6.5 mm in diameter. The previously described burner was employed. Liquid SiCl$_4$ and liquid GeCl$_4$ were maintained at 37° C. in first and second containers, the outputs of which were connected to the burner. Silica was deposited on the mandrel for thirty minutes during which time oxygen flowed through the first container at a rate of about 0.05 slpm to form a layer of low expansion silica soot having a thickness of about 1 mm. A step index core region of SiO$_2$ doped with 10 wt. % GeO$_2$ was then deposited to a thickness of about 12 mm by bubbling oxygen through both the first and second containers. The flow of oxygen to the second container was then stopped and pure SiO$_2$ soot was deposited on the surface of the core soot until an outer diameter of 60 mm was achieved.

The soot preform was removed from the lathe, and the mandrel was removed therefrom, the integral handle remaining at one end thereof. A short section of capillary tubing was inserted into that end of the preform aperture opposite the handle. A drying gas consisting of helium containing 5 volume percent chlorine was flowed through the handle and into the preform aperture. As the preform was lowered into the consolidation furnace, through which a helium flushing gas was flowing, the opening in the capillary tube became sealed, and the preform was subjected to gradient consolidation.

A vacuum connection was attached to the handle, and the aperture of the consolidated preform was evacuated. A silica rod was fused to the tip of the preform which was then inserted into a draw furnace. The preform was heated to about 1900° C. and pulled downwardly at a rate of about 15 cm/min. The diameter of the resultant intermediate fiber was about 7 mm. After the intermediate fiber had been drawn to a suitable length, a 91 cm long section was broken therefrom.

The section of intermediate fiber was supported in the lathe where it functioned as a mandrel for the deposition of additional cladding soot. The burner traversed the intermediate fiber until a sufficient number of layers were deposited to build up a coating of SiO$_2$ cladding soot. The resultant composite preform was gradually inserted into a consolidation furnace having a maximum temperature of 1450° C. where it was consolidated while helium flowed upwardly through the furnace. The resultant consolidated preform, which is shown in cross-section in FIG. 5, had an outside diameter of about 50 mm and a core diameter of about 2.5 mm. One end of the preform was severed and polished smooth to form a planar endface substantially perpendicular to the preform axis. Two 7.0 mm diameter holes were core drilled longitudinally through the consolidated preform on opposite sides of the core at a radius of 10 mm.

Two stress rods were made by the method disclosed in U.S. Pat. No. 2,823,995. A burner continuously traversed an alumina mandrel. Sufficient amounts of SiCl$_4$, GeCl$_4$ and POCl$_3$ were supplied to the burner to form glass soot having a composition of 39 wt. % GeO$_2$, 1 wt. % P$_2$O$_5$ and 60 wt. % SiO$_2$. During each subsequent burner pass, the amounts of GeCl$_4$ and POCl$_3$ were decreased to form a coating of core glass soot having a decreasing concentration of GeO$_2$ and P$_2$O$_5$ until the final burner pass deposited pure SiO$_2$ soot. Thereafter, additional layers of SiO$_2$ soot were deposited to form a coating of cladding soot over the core soot coating. The mandrel was removed and the resultant porous preform was subjected to gradient consolidation as described above. During the consolidation process, chlorine and helium flowed into the preform aperture as described above. The preform aperture closed during consolidation due to the low viscosity of the core glass relative to that of the cladding glass.

The consolidated preform was inserted into a draw furnace where the tip thereof was heated to abut 1900° C. A glass rod was attached to the bottom tip of the preform and it was stretched downwardly at a rate of 10 cm/min. to form a stress rod having an outside diameter of 6 mm. The core portion of the rod had a diameter of 4.2 mm. The concentration of $GeO_2$ and $P_2O_5$ in the core portion varied such that the refractive index gradient of the core was characterized by an alpha of 2.

A 15 cm long silica tube having an outside diameter of 50 mm and a wall thickness of 2 mm was fused to the periphery of the planar endface of the consolidated preform. The stress rods were inserted into the holes that had been core drilled in the preform. The end of the silica tube remote from the preform was then flame-worked and caused to decrease in diameter. A glass fixture having a ground glass joint at one end was fused to the silica tube. A vacuum connection was attached to the ground glass joint and a vacuum was pulled over the flat surface of the preform to effect an evacuation of the space between the rods and the adjacent walls of the core drilled holes. The evacuated blank was inserted into the draw furnace where the tip thereof was subjected to a temperature of about 2100° C. The resultant step-index, single-mode optical waveguide fiber had a core diameter of about 8 μm and an outside diameter of 125 μm. The attenuation of the resultant fiber was 4.5 dB/km at 850 nm, and the beat length L was between 2 and 3 cm.

An optical fiber having multiple light transmitting cores could be similarly constructed. Indeed, the stress rods of the above-described specific example are formed of a glass having a refractive index greater than that of the silica cladding glass. Therefore, each stress rod of the fiber formed by the aforementioned example is capable of propagating light energy when properly excited by an input light beam.

I claim:

1. A method of forming a polarization preserving optical fiber having multiple light transmitting cores comprising
providing a preform of glass having a first composition,
forming on one end of said preform a flat surface that is substantially perpendicular to the axis thereof,
forming in said preform a plurality of longitudinally-extending holes,
fusing to said endface a thin-walled glass cylinder,
providing a pair of rods of glass having a refractive index which is greater than that of said cladding glass, the diameters of said rods being less than that of said holes,
enlarging the diameter at one end of each of said rods thereafter
inserting one of said rods into each of said holes such that the enlarged end of each rod protrudes from the respective hole, wherein said rods are prevented from melting and sliding downwardly in said holes,
affixing a vacuum connection to said cylinder and evacuating the space within said cylinder and the space between said rods and the adjacent walls of said holes, and
drawing the resulting assembly to bond together said glass rods and said preform into an integral optical fiber.

2. Method of claim 1 wherein the step of providing two glass rods comprises forming by a vapor deposition technique a pair of glass rods having a core region of glass, the refractive index of which is greater than that of said preform cladding, said core region being surrounded by a cladding region of glass having a composition the refractive index of which is less than that of said core region.

3. A method of forming a polarization preserving optical fiber comprising the steps of
providing a cylindrical preform comprising a centrally disposed glass core surrounded by a layer of cladding glass having a first composition, said preform cladding glass having a refractive index lower than that of the core glass,
forming in said cladding glass on diametrically opposed sides of said preform core a pair of longitudinally-extending holes, the axes of which are parallel to that of said core,
providing a pair of glass rods having a thermal coefficient of expansion which differs from that of said preform cladding glass, the cross-sectional area of said rods being slightly smaller than that of said holes except at one end thereof where the rod cross-sectional area is greater than that of said holes,
inserting one of said rods into each of said holes prior to drawing, the large diameter ends of said rods protruding above said preform, wherein said rods are prevented from melting and sliding downwardly in said holes,
affixing a vacuum connection to that end of said preform from which the large diameter ends of said rods protrude, whereby the space between each rod and the adjacent walls of said holes is evacuated, and
drawing the resulting assembly to bond together said glass rods and said preform into an integral optical fiber.

4. A method in accordance with claim 3 wherein the step of providing a plurality of rods comprises providing rods having a glass core surrounded by a layer of cladding glass having a composition different from that of said glass core.

5. A method in accordance with claim 3 wherein the step of providing a plurality of rods comprises providing rods having a glass core surrounded by a layer of glass of said first composition.

6. A method in accordance with claim 3 wherein, prior to the step of inserting one of said rods into each of said holes, said method comprises the step of subjecting said preform to a temperature sufficiently high that the walls of said holes are smoothed thereby, said temperature being just below that which would cause said preform to elongate if it were suspended by its end.

7. A method in accordance with claim 6 wherein said preform is heated to a temperature between 1850° and 1900° C.

* * * * *